July 18, 1967 T. J. LUNSFORD 3,331,497

ELECTRICAL COMPONENT PACKAGE

Filed Oct. 23, 1965

INVENTOR.

THOMAS J. LUNSFORD

BY

Richard K. Macneill

United States Patent Office 3,331,497

Patented July 18, 1967

3,331,497
ELECTRICAL COMPONENT PACKAGE

Thomas J. Lunsford, 373 W. Madison B, El Cajon, Calif. 92020

Filed Oct. 23, 1965, Ser. No. 503,337
4 Claims. (Cl. 206—56)

Figure 1:
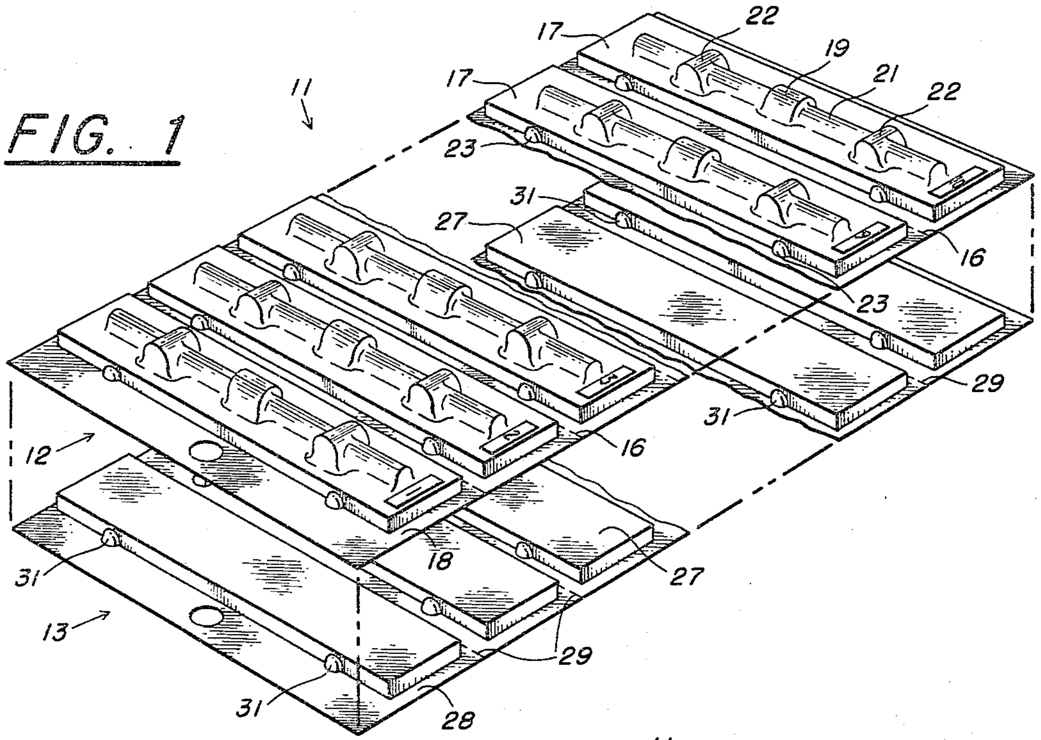

In the present invention relates to an electrical component package and more particularly to an electrical component package which can be opened for testing the component therein enclosed an indefinite number of times.

According to the invention a component package is provided which has one portion having a cavity for receiving the body of the component such as a pigtail carbon resistor with recesses extending on each side for the electrical leads therefrom. A second portion is provided which is contoured for a snug mating with the first portion having suitable latching protrusions cooperating with complementary recesses in said first portion for effecting a press fit thereto. Each portion can be made in long strips of plastic, for example, having perforations between each adjacent component recess for tearing off one or more components at a time but keeping them individually packaged. For testing the component the second portion can be pulled away from the first portion leaving the components in the first portion and the leads of the components exposed for making contact with testing apparatus. After testing the second portion can be conveniently snapped back into place completing the strip of component packages for a ready supply of tested stock.

An object of the present invention is the provision of an electrical component package which can be provided in perforated strips.

Another object is to provide an electrical component package which can be opened and closed for component testing purposes an indefinite number of times.

A further object of the invention is the provision of an electrical component package which is simple and inexpensive to manufacture and is reusable over an indefinite number of times.

Figure 2:
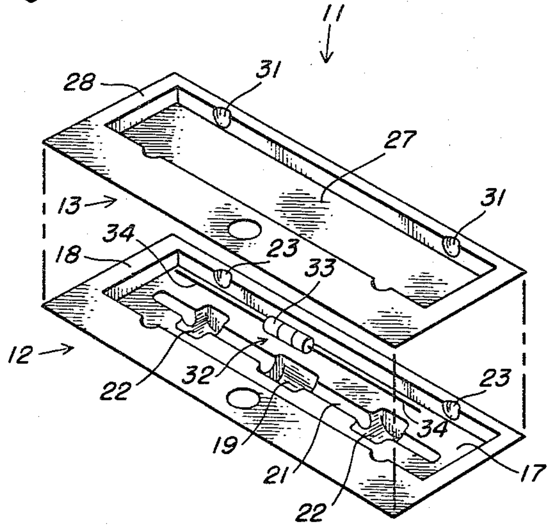

Other objects and many of the attendant advantages of this invention will be readily appreciated as the same becomes better understood by reference to the following detailed description when considered in connection with the accompanying drawing in which like reference numerals designate like parts throughout the figures thereof, and wherein:

FIG. 1 is an exploded view of a strip of the preferred embodiments of the present invention shown in perspective; and FIG. 2 is an exploded view in perspective of one component package of FIG. 1 together with a component to be packaged.

Referring to FIG. 1, a strip of component packages is shown generally at 11 having a first portion 12, and a second portion 13. Portion 12 has a plurality of rectangular recesses 17 separated by perforations 16, leaving a shoulder 18 surrounding each recess 17. Recesses 17 have component body recesses 19 and electrical lead extension recesses 21. Testing clip recesses 22 are spatially disposed from component body recesses 19 along electrical lead recesses 21.

Each rectangular recess 17 has a plurality of mating recesses 23 and an identification number.

Second strip 13 also has a plurality of rectangular recesses 27 each surrounded by a flange 28 and separated by perforations 29. Rectangular recesses 27 also have a plurality of protrusions 31 which cooperate with mating recesses 23 in rectangular recesses 17.

Referring to FIG. 2, one of the rectangular recesses 17 and 27 is shown apart from a strip together with a component 32 having a body 33 and electrical leads 34.

Referring back to FIGS. 1 and 2, the strips 12 and 13 are preferably vacuum formed clear plastic. In the original packaging, the strip 12 is inverted and, as shown in FIG. 2, a component such as resistor 32 is placed in each of the component body recesses 19 with the axial leads 34 in lead recesses 21. After the components are all placed in their respective recesses, strip 13 is then placed on top of strip 12 and gently pushed into place with rectangular recesses 27 fitting within rectangular recesses 17 of strip 12. The mating recesses 23 and protrusions 31 cooperate to lock strips 12 and 13 together for shipping or storing.

When it is desired to test the components within the packages 11, it is only necessary to pull off strip 13 and test each component at the testing probe recesses 22 to determine their condition. After testing, strip 13 can then be placed back into position on strip 12, resealing the package.

Perforations 16 and 29 make it possible for a consumer to tear off any number of components he so desires without disturbing the rest of the strip. Numbers allow a checker to record results of a testing of a strip of components. It can be seen that after a component has been removed from a package, the package is completely reusable for a like-sized component. While a resistor has been shown, it is to be understood that any suitable electrical component can be accommodated by the instant invention.

It should be understood, of course, the foregoing disclosure relates to only a preferred embodiment of the invention and that it is intended to cover all changes and modifications of the example of the invention herein chosen for the purposes of the disclosure which do not constitute departures from the spirit and scope of the invention.

I claim:

1. An electrical component package of electrical components having connecting leads comprising:
   - a first sheet member having a recess therein;
   - a component recess within said recess, said component recess having a component body recess and a plurality of connecting lead recesses extending therefrom;
   - a second sheet member having a protrusion therein, said second member's protrusion dimensioned for a snug fit within said first member's recess; and
   - a plurality of cooperating latching recesses and latching protrusions in said first and second members.

2. The electrical component package of claim 1 and further including a plurality of testing recesses spatially disposed along said plurality of connecting lead recesses, respectively.

3. An electrical component package of electrical components having connecting leads comprising.
   - a first sheet member having a plurality of recesses therein;
   - a component recess within each of said plurality of recesses; each of said component recesses having a component body recess and a plurality of component connecting lead recesses extending therefrom;
   - a second sheet member having a plurality of protrusions therein, each of said plurality of protrusions being dimensioned and positioned for a snug fit within a different one of said recesses when said first and second members are superimposed; and
   - a plurality of cooperating latching recesses and latching protrusions in said first and second members.

4. The electrical component package of claim 3 and further including a testing recess spatially disposed along each of said component connecting lead recesses.

(References on following page)

References Cited

UNITED STATES PATENTS

| | | | |
|---|---|---|---|
| 2,211,326 | 8/1940 | Gillice | 220—23 |
| 2,417,592 | 3/1947 | Dwyer. | |
| 2,619,227 | 11/1952 | Arthur. | |
| 2,772,771 | 12/1956 | Wheldon et al. | 206—0.4 |
| 3,088,587 | 5/1963 | Dimmig et al. | |
| 3,124,248 | 3/1964 | Geoffrion et al. | |
| 3,229,809 | 1/1966 | Spadaro | 206—0.82 |

LOUIS G. MANGENE, *Primary Examiner.*

THERON E. CONDON, *Examiner.*

J. M. CASKIE, *Assistant Examiner.*